Figure 1:
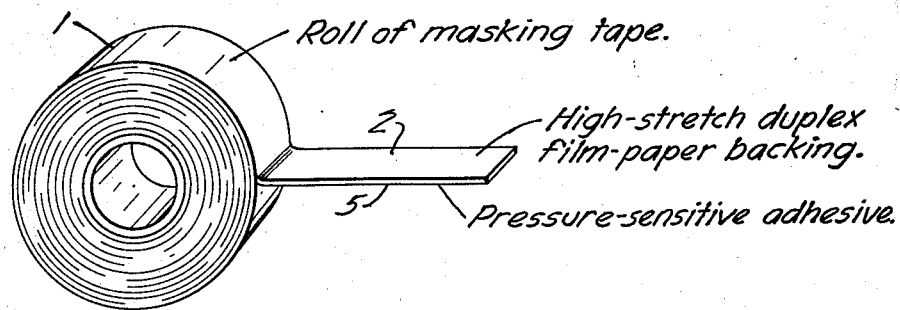

Oct. 4, 1960   F. SWEDISH, JR., ET AL   2,954,868
MASKING TAPE
Filed Sept. 25, 1957

INVENTORS
FRANK SWEDISH, JR.
LLOYD E. PICARD
RICHARD GURLEY DREW
BY
Carpenter, Abbott, Coulter, & Kinney
ATTORNEYS

United States Patent Office 2,954,868
Patented Oct. 4, 1960

2,954,868

MASKING TAPE

Frank Swedish, Jr., Hudson, Wis., and Lloyd E. Picard, St. Marys Point, and Richard Gurley Drew, St. Paul, Minn., assignors to Minnesota Mining and Manufacturing Company, St. Paul, Minn., a corporation of Delaware Filed Sept. 25, 1957, Ser. No. 686,132

2 Claims. (Cl. 206—59)

This invention relates to a novel type of pressure-sensitive adhesive masking tape having a novel physical structure imparted by a novel high-stretch duplex film-paper backing in which a creped beater-sized paper element is employed. This masking tape has a novel combination of properties that make for improved performance. The novelty of the tape is emphasized by the fact that a novel manufacturing procedure is utilized.

The present masking tape is quite different from the conventional masking tapes having a backing whose sole structural element is a creped paper that has been impregnated with a fiber-unifying material and which may or may not have thin sizing or priming coatings thereon. Advantages of the present masking tape over conventional tapes heretofore employed in automobile body finishing shops, that are readily apparent to the work, include: smoothness of the back surface, which has a smooth suede-like feel when rubbed with the fingers; a soft and pliant feel when handled and applied; greater thinness and flatness; greater conformability and stretchability.

Masking tapes, supplied in roll form, have been commercially used on a large scale for many years. The conventional backing is a porous creped paper, similar to absorbent towelling paper, that is impregnated and unified by a flexible and stretchable composition which binds the fibers together, so as to unify and strengthen the paper and provide smooth tape edges, and which provides a barrier to penetration by lacquer solvents and the like. The back surface is commonly given a thin coating of shellac or a synthetic resin to reduce the force required to unwind the tape, this coating being termed a backsize. The front surface is commonly given a primer coating to improve the bonding of the adhesive coating, and is then coated with a normally tacky and pressure-sensitive rubbery-base adhesive.

Such masking tapes are widely used in connection with painting operations to mask various surface areas from the applied paint, lacquer, varnish or enamel, and following drying or curing, often involving a baking operation, the tape is stripped off.

The dry pressure-sensitive adhesive coating is aggressively tacky in its normal state at normal temperatures, so that the tape strongly adheres to surfaces upon mere finger pressing without need of heating or moistening. This adhesive is stretchable and highly cohesive, permitting unwinding and removal of the tape without offsetting or transfer of adhesive and permitting handling without gumming the fingers. The unified backing does not rupture or delaminate when the tape is unwound from the roll or removed from surfaces to which applied, despite the force exerted by the aggressively tacky adhesive which resists unwinding and removal. The unified creped paper backing, as well as the adhesive, has a "dead-stretch" (as distinguished from a "live-stretch" such as that of rubber bands) and this permits of conformation to curved or irregular surfaces and permits the tape to be applied so as to define a stable curved masking edge when desired.

The tape is readily tearable so that a workman need only use his fingers to obtain a piece of tape from the roll.

The impregnants heretofore commonly used for saturating and unifying the preformed absorbent creped paper have been of two types. The first type is essentially a fluxed blend of broken down rubber (natural or synthetic), compatible thermoplastic tackifier resin (such as rosin), and zinc oxide, applied as a solution in a hydrocarbon solvent. The second type is a synthetic rubbery polymer applied as a solution in an organic solvent or, more commonly, as an aqueous dispersion or latex. The impregnant may include vulcanizing agents. In some instances a non-rubbery sub-polymer has been employed which, after impregnation of the paper, has been polymerized or vulcanized to a rubbery state. These various impregnants have penetrated the pores and interstices of the preformed fibrous paper structure to glue the fibres together and also to provide a filler having the desired barrier action to impede penetration by lacquer solvents in use of the tape. The weight of the dried impregnant found necessary is generally in the range of about 50 to 100% of the weight of the untreated paper, i.e., 50 to 100% of the fiber weight.

An obviously apparent physical characteristic of prior masking tapes is the creped structure of the paper. The number of crepe lines per inch of length has been in the range of about 15 to 30. The back of the tape has had rugosities or wrinkles of a number and size such that they are not only plainly visible but make for a rough feel when the tape is stroked or rubbed with the fingers, the extremely thin backsize coating not rendering the surface smooth. This roughness is objectionable since many users complain that finger irritation is caused when large amounts of tape are applied day after day. The difficulty was not fully overcome even when the impregnated creped paper backing was subjected to calendering in an attempt to smooth down the creping as much as possible consistent with maintenance of desired characteristics; thus the manufacturing procedure described in U.S. Patent No. 2,633,430 (March 31, 1953) did not fully solve this problem owing to the nature of the backing material employed.

The creping heretofore employed in commercial masking tapes has imparted a stretch value in the range of about 5 to 12% (by which is meant the percent elongation when the tape is pulled by hand until it ruptures). This stretch value is inadequate for easy application of the tape in instances requiring severe curving; but prior attempts to substantially increase the stretch value have been unsuccessful because of attendant difficulties rendering the tape unsuitable as a general purpose masking tape, as for instance rendering the tape too hard to tear.

The foregoing summary will permit of a better understanding of the requirements and of the novel features of the new and improved masking tape of the present invention.

Objects of the invention are to provide a commercially useful masking tape of general utility having the requisite properties but which does not utilize the above-mentioned principle of impregnating a preformed creped paper to obtain the unified tape backing, and which does not have a rough back surface, and which does not have the above-mentioned limited stretch value, characteristic of masking tapes as heretofore manufactured, and which can be manufactured without use of organic solvents at any stage.

The product is illustrated in the accompanying drawing wherein:

Fig. 1 shows a roll of the masking tape 1, having a high-stretch duplex film-paper backing 2 coated on the inner, paper side with a pressure-sensitive adhesive layer 5, which tape can be unwound from the roll without delamination or internal rupture and without offsetting of adhesive.

Figure 2:
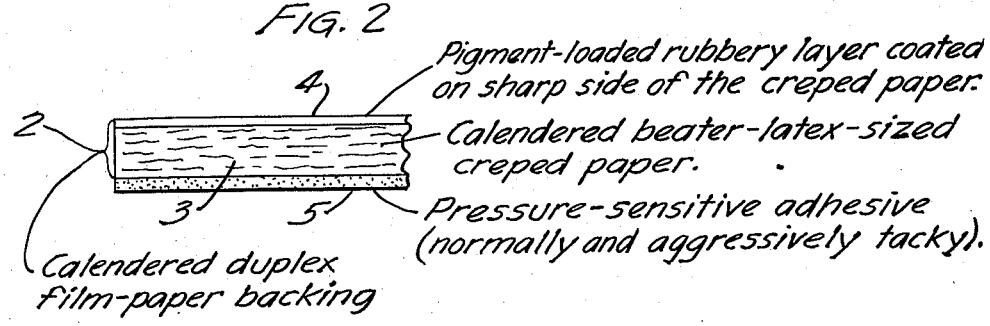

Fig. 2 is a schematic enlarged edge view of the tape wherein a calendered duplex film-paper backing 2 is shown to be formed of a calendered beater-latex-sized creped paper element 3 which is coated on the sharp side with a pigment-loaded rubbery layer or film 4; having united to the paper side a pressure-sensitive adhesive coating 5, this adhesive being normally and aggressively tacky.

The unified duplex film-paper backing (which carries the pressure-sensitive adhesive on the paper side) is responsible for the novel characteristics of our masking tape. The paper element of this duplex backing is formed on the wet end of the paper-making machine from a semi-glassine stock (the fibers having been beaten to a high freeness value, preferably using an unbleached or semi-bleached kraft pulp beaten to a Williams freeness value of about 100 to 400 seconds) that includes a precipitated rubber latex sizing (such as a latex of a polychloroprene or a Buna rubber); deposition of latex solids particles upon the fibers thus occurring prior to formation of the wet paper on the paper-making machine. Pigments and vulcanizing agents may be included in the sizing composition so as to be incorporated in the paper to provide a modification of the rubbery latex sizing. Thus vulcanization may be employed to render the paper element of the tape more heat-resistant. Wet strength resins may be incorporated in the beater stock prior to incorporation of the latex sizing so as to impart improved aging of the paper product under high-humidity and high-temperature conditions.

During the paper-making operation, the latex-containing paper is given a fine creping while still in a wet or damp condition, prior to complete drying on the heated cylinders. The dried creped paper is finished with a hard calendering that greatly reduces its caliper thickness, increases its density, and flattens the creping wrinkles. In a typical example this calendering reduces the caliper thickness from 12 mils to 5 mils. This type of paper may aptly be designated as a hard-calendered, semi-glassine, beater-latex-sized, wetcreped paper. The term "beater-latex-sized" indicates that the latex sizing of the fibers occurred after beating and prior to paper formation on the wet end of the paper machine so that the paper is formed from latex-bearing fibers. The mixing of the latex with the stock and the deposition of the latex sizing solids need not literally occur in the "beater" machine but may take place in whole or in part in a chest or other interposed mixing apparatus in the stock line.

The highly-beaten semi-glassine fiber stock employed in making our paper contains fibers whose fibrillation and gellation results in fiber-to-fiber bonds in the paper product that increase the unification of the structure, and is one of the factors that permits of using a relatively low percentage of latex binder solids. Part of the latex particles form flocs that do not coat the fibers although trapped in the fibrous structure and contributing to the over-all unification. Use of a highly beaten stock also improves the heat-resistant properties of the tape product so that it has greater strength at high temperatures.

Such beater-sized paper differs markedly in structure and properties from a paper that has been impregnated with latex sizing subsequent to formation of the paper. In particular, the latex particles are uniformly distributed throughout the body of the paper and the number of fiber-to-fiber bonds is reduced owing to the substantial proportion of fiber-latex-fiber bonds. A semi-glassine type of paper such as we employ cannot be effectively impregnated with latex after formation of the paper. The initial presence of the latex sizing in the structure of the wet paper imparts a higher wet-strength and it permits of fine retained creping, to obtain a high stretch that is not lost in the subsequent drying operation on the paper-making machine. In contrast, it is difficult or impossible to adequately impregnate a preformed high-crepe high-stretch paper without serious loss of stretch. Our paper is provided with crepe lines in the range of about 40 to 100 per lineal inch. This fine-creping combined with the hard-calendering results in a relatively thin and smooth, highly stretchable, paper element of the tape backing. A typical paper has a caliper thickness of about 5 mils and a stretch value of at least 15% (preferably 20 to 30%) when a strip is hand-pulled.

A further distinguishing feature is that we employ a much lower proportion of latex solids than has heretofore been utilized in commercial creped-paper masking tape backings. If this low proportion were employed in impregnating a conventional creped-paper backing, the latter would be inadequately unified and would split or delaminate when the masking tape product was unwound or stripped from a surface. The weight of the dry sizing solids relative to the weight of the fibers is in the range of about 10 to 50%, preferably of the order of 20%. The result is that the paper product is much more porous even after compacting by calendering. This paper is not suited for use as such as a general purpose masking tape backing even if given any of the conventional sizing and priming coatings. It is designed for use as a component of the duplex film-paper backing that we utilize.

The pigment-loaded rubbery film element of the duplex backing is incorporated by coating an aqueous dispersion of the film-forming mixture upon the "sharp" side of the above-described paper element, followed by drying and by calendering to provide a relatively flat smooth back film surface having a suede-like feel. (The "sharp" side is the side of creped paper which carries the sharp crepe lines or ridges.) The dried film has a dead-stretch and is firmly bonded to the porous paper substrate to form a unified and unitary combination having a dead-stretch and a stretch value of at least 15% (preferably 20 to 30%). The film has a thickness of about ½ to 1 mil and provides a structural film element as distinguished from a mere sizing or other conventional coating. Preferably a very thin sizing coating of a release agent is applied to the film surface, adapted to reduce the force required for unwinding the adhesive tape product from rolls, such sizing being known in the tape art as a low-adhesion back-size. The caliper thickness of a typical film-paper backing is about 5 mils, approximately that of the paper element prior to the calendering of the composite backing. This duplex backing is somewhat thinner than conventional creped-paper masking tape backings and yet has adequate tensile strength, e.g., a tensile strength of 15 to 20 pounds per inch of width.

The film is a pigment-loaded rubber polymer mixture. The coating composition is an aqueous dispersion of rubber latex and pigment, the proportion by weight of the pigment preferably being at least about equal to that of the rubber solids and the latter being in sufficient proportion to provide a cohesive film structure. Vulcanizing agents can be included so that upon subsequent heating the pigmented-film will be rendered more heat-resistant and solvent-resistant. In addition to its mechanical structural function, the film element increases the tensile strength and it provides a barrier to penetration of common lacquer solvents. The pigment is essential in imparting dead-stretch and finger-tearable characteristics to the rubbery film and thereby to the composite backing, and in addition it minimizes penetration of the aqueous film-coating composition into the porous paper substrate. Pigmentation improves resistance of the tape product to outdoor weathering. The pigmentation of the film also results in the masking tape having greater internal strength so that it can be readily removed intact following use in a painting operation. The tape is non-slivering. "Slivering" means that when a masking tape is removed from the job (particularly when jerked back on itself) there is a rupturing of the backing which leaves shred-like residues of tape on the surface, requiring a clean-up job to remove these tenaciously adhering bits of tape. Butadiene-acrylonitrile and butadiene-styrene copolymer rubbers (Buna-N and Buna-S rubbers), and polychloroprene rubbers, are commercially available preferred examples for providing the rubber phase of the film. The dispersed pigment phase is preferably supplied by clay or by titanium dioxide or a mixture thereof, although other rubber-compounding pigments can be employed. The pigment preferably constitutes about 40 to 80% by weight of the composite dried film.

To complete the masking tape product, a pressure-sensitive adhesive solution or dispersion is coated upon the paper side of this backing and penetrates the porous paper structure to secure a strong anchorage, no primer being needed, resulting after drying in a firmly bonded adhesive coating. A feature of the present tape construction is that the adhesive may be applied in the form of an aqueous dispersion without causing warping or distortion during drying and without need of a primer to secure strong anchorage. A denser adhesive layer is obtained, owing to the fact that solvent or moisture can escape into the porous paper structure from the adjacent adhesive coating during the drying operation, and can escape in vapor form (together with displaced air) through the vapor-permeable pigmented film element. The dried adhesive sheeting is slit and wound into rolls of desired size. The denser adhesive contributes to the obtaining of rolls having good stability over long periods.

The tape product is designed to have a "dead-stretch" value of at least 15% when hand-pulled; preferably 20 to 30%, although still higher values can be obtained. The novel construction results in a stress-strain characteristic permitting hand-stretching with less effort than in the case of prior commercial tapes. This allows easy conformation to curved surfaces and the obtaining of good curved masking edges even when severe curves are required. The improvement in this respect over conventional masking tapes is of striking magnitude. The present tape can be applied to define a curved edge having a radius of curvature as small as one-fourth inch or less. The tape can be readily torn with the fingers and yet has adequate tensile strength.

The finished tape closely resembles so-called "flat back" tape (non-creped) despite the high degree of stretch and conformability, and can be used day after day without irritating the fingers. It has an exceptionally soft and pliant feel when being unwound from a roll and applied. A clean sharp line of demarcation is obtained at the juncture of painted and masked surface areas which prevents fluid paint or lacquer from seeping under the tape or building up on the edges, whether the tape be applied to provide straight or curved masking edges.

The tape can be readily applied even when a long straight masking edge is desired. In this case the tip end of the tape is positioned and pressed into holding contact with the surface, the requisite long length is unwound from the roll and the torn off freed end is positioned and pressed into holding contact with the surface in such manner that the intervening tape is under mild tension and is taut, following which the intervening length of the tape is pressed into holding contact with the surface. This long-length applying operation is facilitated by the tape's "reverse cupping" property, by which it is meant that a free length of tape when stretched develops a crosswise concavity on the back side rather than on the adhesive side, contrary to the behavior of conventional masking tapes heretofore available, so that the edge of the long piece of tape can more readily be pressed down to define an accurately-located long straight masking edge. The pigment-loaded film element of the backing structure restrains the reverse-cupping property so as to avoid excess cupping or roping that would interfere with the proper application of the tape. The desired effect is not obtained unless the film is bonded to the sharp side of the creped paper element.

Rolls of the present tape have good stability. No gapping or telescoping occurs upon long standing.

The general idea of employing beater-sized paper in masking tapes, as a possible alternative to use of impregnated preformed paper, was conceived by one of us many years ago and disclosed in an application filed in 1933, since issued as U.S. Patent No. 2,251,273 (Aug. 5, 1941)—see particularly page 6, col. 2, lines 38–59. In the course of numerous experiments in trying to successfully utilize that idea in manufacturing masking tape of general commercial value, it was found from one failure after another that the goal eluded attainment and there was pessimism as to whether the idea might be inherently unsound and impractical. Some of the more recent work on this project was described in an application of co-workers filed in 1947, since issued as U.S. Patent No. 2,666,699 (Jan. 19, 1954), which also failed to develop a commercially acceptable masking tape. One difficulty has been that commercial masking tapes had reached a high level of development over a period of many years, along the lines previously described. Users of these tapes were not satisfied with any novel tape unless it possessed all of the desirable features of available tapes in addition to whatever further features might be provided, although some users might tolerate a sub-standard tape if sold at a low enough price. Cost had become a major consideration and it was especially difficult to interest the general run of users in any higher-priced product when available tapes were considered good enough by familiar standards.

One of the most undesirable properties of prior experimental masking tapes was that of "slivering," a previously explained type of defect that is fatal to general acceptance even if the tape is otherwise satisfactory.

The present invention is the culmination of labors over many years and for the first time makes available a high-stretch non-slivering smooth-surfaced masking tape that utilizes a beater-sized paper in the backing, and which is economical to manufacture, which is substantially equal or superior to present standard tapes in every significant respect, and which provides desirable novel performance features not heretofore available in commercial tapes of general utility. This has been verified not only by extensive laboratory tests and comparisons but by shop usage under working conditions.

*Example*

This example describes in some detail the making of a presently preferred embodiment of our masking tape but the invention is not limited thereto and embraces equivalent constructions.

Commercial scale paper mill equipment is employed comprising in connected series a beater, a storage chest, a cylinder type paper machine having an endless wet press felt which picks up the wet fiber layer from the cylinder screen and transfers it to a steel wet press roll. This wet press felt is a very fine wool felt adapted to impart only a slight and fine mark to the wet paper web, thereby permitting of fine creping on the wet press roll by means of a suitable thin steel creping blade (e.g., a blade having a thickness of 10 to 30 mils) adapted to impart a fine crepe. An endless woven cotton belt transfers the wet creped web into a dryer section of the machine where the paper is dried by passing around a series of heated steel cylinders. The dried creped paper then passes between calender rolls to reduce the caliper and then passes through an air-knife coater where a latex-pigment coating is applied to the sharp side of the paper to provide the film element of the combination. The coated paper is dried by passage through a further dryer section and the dried film-paper web is passed between calender rolls to reduce the caliper and provide a smooth product having the appearance and feel of a flat paper.

The web then passes through a coater (e.g., squeeze rolls or air-knife) for application of a solution or aqueous dispersion of a low-adhesion backsize polymer. A very thin coating is thus applied upon the film surface. The web is again dried by passing around heated cylinders and is wound up to provide large rolls of finished tape backing.

The backing web is passed through a knife-coater for application of pressure-sensitive adhesive solution to the paper side and is dried by passage through a hot air drying oven to remove the solvent. Instead of employing an adhesive solution in a solvent vehicle, use can be made of an aqueous dispersion, which can be applied by means of an air-knife coater, followed by passage through a drying oven or over heated drying rolls. The dried adhesive coated web is wound into lareg jumbo rolls, which are sent to the slitter where the web is slit into tapes of desired width and wound into rolls of tape of desired length.

An illustrative preferred procedure for manufacturing the tape backing in the above-described manner will now be given:

The beater is charged with 600 lbs. of unbleached kraft wood pulp and sufficient water to provide a 3% (by weight) consistency. The pulp is subjected to hard and prolonged beating that results in a semi-glassine stock having a Williams freeness value of 125 seconds. The beater roll is then raised away from the bed plate to permit of mixing without further beating. The pulp slurry is diluted with water to 2% consistency and the following mixture is added and thoroughly mixed with the stock:

| | Pounds |
|---|---|
| Water | 25.0 |
| Soda ash | 3.0 |
| Zinc oxide | 18.0 |
| Antioxidant (e.g., 2,2'methylene bis(4-methyl, 6-tertbutyl phenol), such as "Antioxidant 2246" made by American Cyanamid Co.) | 2.4 |
| Dispersing and stabilizing agent (e.g., a sodium salt of a condensed aryl sulfonic acid, such as "Tamol N" made by Rohm & Haas Co.) | 2.4 |

The resultant beater stock has a pH value of about 9. Then 316 pounds of aqueous latex dispersion containing 120 pounds of latex solids is added and thoroughly mixed with the pulp. A polychloroprene latex (such as "neoprene," type 735, made by Du Pont) is used, although equivalent rubber polymer latexes may be employed. A 25% aqueous solution containing 100 pounds of alum is slowly added with gentle mixing to precipitate the rubbery latex and zinc oxide particles on the pulp fibers, the pH value being about 4.5. The precipitation coats the fibers with a mixture of zinc oxide and collodial rubber particles, although some coagulation occurs to form finely divided flocs held by the fibers. The sized fibers hold the precipitated solids sufficiently well so that a clear white water is obtained at the paper machine, substantially all of the solids being carried into the paper. The zinc oxide is employed to cure the polychloroprene and to neutralize any acid liberated by it during aging of the tape product.

The moist paper containing the sizing solids is given a fine creping resulting in an average of about 60 crepe lines per lineal inch. The dried creped paper has a caliper thickness of approximately 12 mils which is reduced by the calendering to 5 mils. The resultant paper has a ream weight of 45 pounds (weight of 333⅓ square yards), corresponding to 135 pounds per thousand square yards, a lengthwise tensile strength of 15 pounds per inch width, and a lengthwise strength of 27% when pulled to rupture.

The pigmented rubber coating composition is prepared by first making a slurry of equal parts by weight of water and a rubber-compounding type of clay (for example a hard purified Georgia clay such as "Aiken" clay or "Dixie" clay) using a dispersing agent (for example 1% of tetrasodium phosphate). This slurry is mixed with an aqueous latex dispersion of a butadieneacrylonitrile polymer (55:45 monomer proportion by weight) having a Mooney value of about 100, the rubber solids being in the proportion of 40% by weight. The ratio of clay solids to rubber solids (dry basis) is 3:1. This aqueous coating mixture is applied to the sharp side of the creped paper element in a coating weight that provides a dried film having a thickness of approximately ½ mil and weighing about 38½ pounds per thousand square yards. The subsequently calendered film-paper combination has a total caliper thickness of 5 mils, a tensile strength of 18 pounds per inch width, and a strength of 22%.

The low-adhesion backsize coating composition consists of a 10% by weight solution in toluol of a copolymer of octadecyl acrylate and acrylic acid (monomer weight ratio of 3:2). An aqueous dispersion can be used. This type of backsize is described in U.S. Patent No. 2,607,711 (Aug. 19, 1952). The dried backsize coating is extremely thin and weighs approximately 2 pounds per thousand square yards.

The pressure-sensitive adhesive-coated finished tape product has a total caliper thickness of 6.5 mils, a tensile strength of 19 pounds per inch width, and a stretch of 21% when hand pulled.

We claim:

1. A pressure-sensitive adhesive tape of the character described, wound upon itself in roll form and consisting of a duplex film-paper backing coated on the paper side with an aggressively tacky pressure-sensitive adhesive; said backing comprising a calendered combination of a hard-calendered semi-glassine beater-latex-sized wet-creped paper element coated on the sharp side with a dead-stretch pigment-loaded rubbery film element integrally united thereto; said paper element containing sizing solids in the proportion of 10 to 50% of the paper fibers on a dry weight basis and having 40 to 100 crepe lines per lineal inch; such that the tape is finger-tearable, has a smooth-feeling back surface, has a dead-stretch and a stretch value of at least 15% when hand pulled, is non-slivering, and can be unwound from the roll without delamination or internal rupture and without offsetting of adhesive.

2. A masking tape according to claim 1 wherein the rubbery film element contains 40 to 80% by weight of dispersed pigment, and the film-paper backing has a thickness of about 5 mils, a stretch value of 20 to 30%, and a tensile strength of at least 15 pounds per inch width.

References Cited in the file of this patent

UNITED STATES PATENTS

| 1,962,340 | Dow | June 12, 1934 |
|---|---|---|
| 2,236,527 | Drew | Apr. 1, 1941 |
| 2,251,273 | Drew | Aug. 5, 1941 |
| 2,269,712 | Drew | Jan. 13, 1942 |
| 2,438,195 | Tierney | Mar. 23, 1948 |
| 2,458,166 | Homeyer | Jan. 4, 1949 |
| 2,633,430 | Kellgren | Mar. 31, 1953 |
| 2,635,045 | Bixler et al. | Apr. 14, 1953 |
| 2,666,699 | McQuiston et al. | Jan. 19, 1954 |
| 2,725,981 | Abere et al. | Dec. 6, 1955 |
| 2,772,970 | Feigley | Dec. 4, 1956 |